Dec. 2, 1930.  A. AMES, JR  1,783,399
ART OF AND APPARATUS FOR MOTION PICTURE PHOTOGRAPHY
Filed Oct. 25, 1921  2 Sheets-Sheet 2
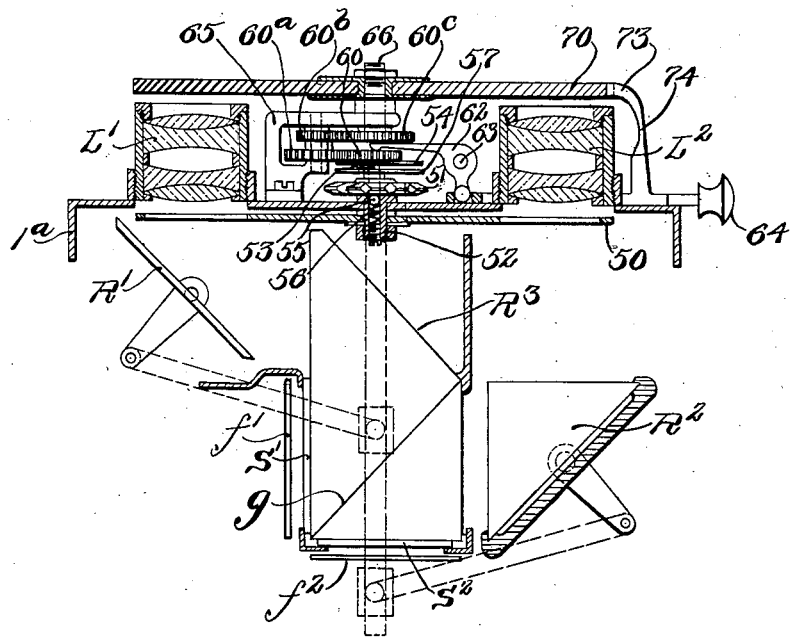
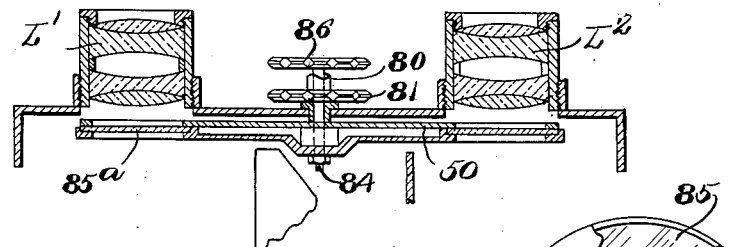
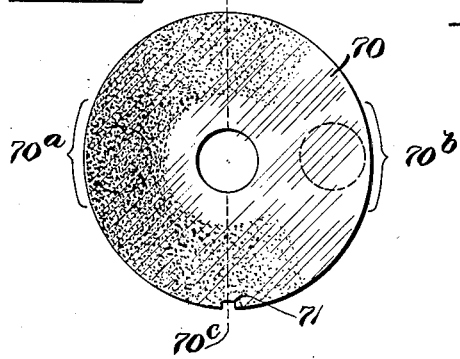
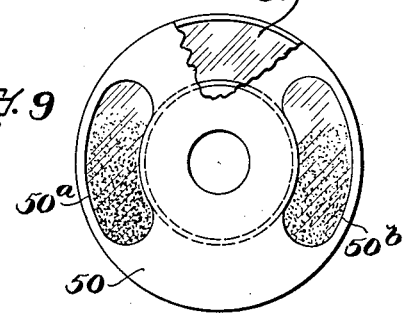
Inventor
Adelbert Ames, Jr.
by Roberts, Roberts & Cushman
his attys.

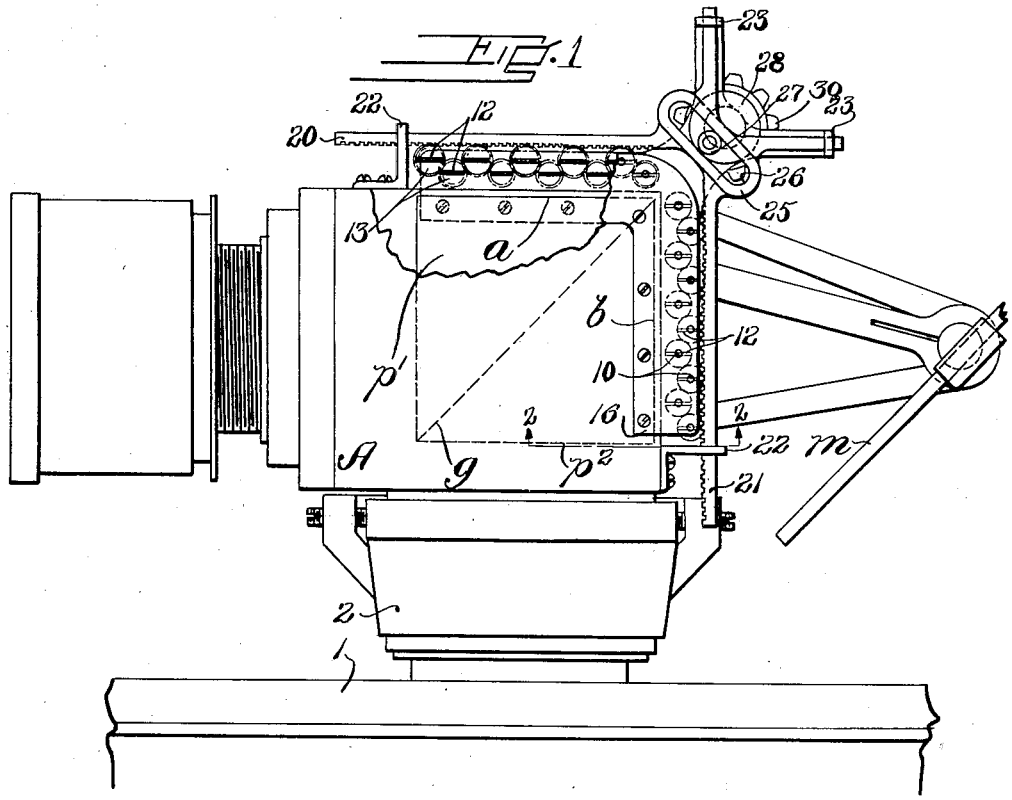
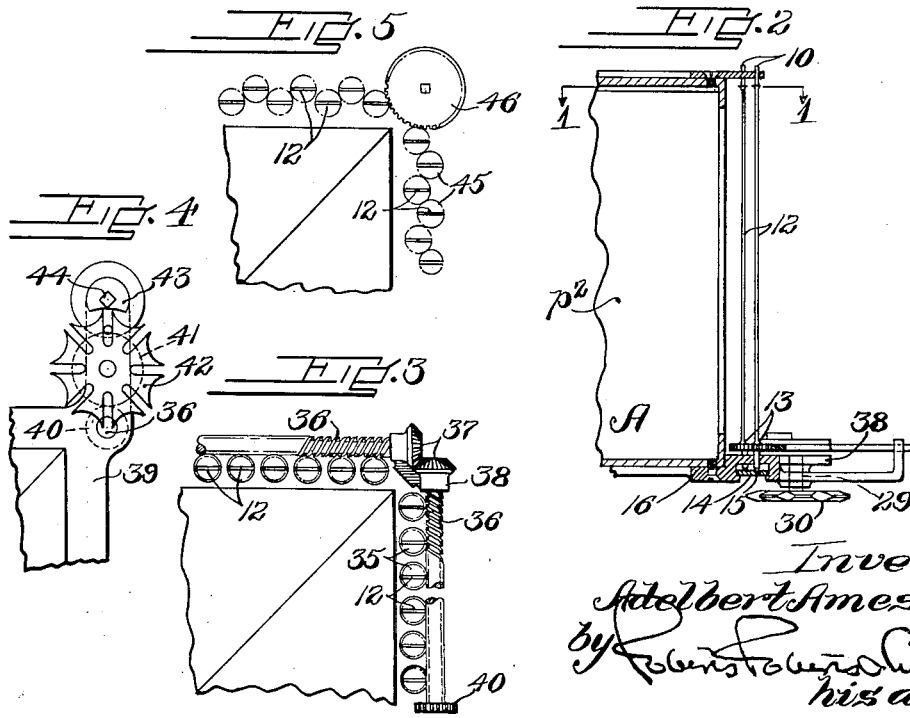

Patented Dec. 2, 1930

1,783,399

UNITED STATES PATENT OFFICE

ADELBERT AMES, JR., OF TEWKSBURY, MASSACHUSETTS

ART OF AND APPARATUS FOR MOTION-PICTURE PHOTOGRAPHY

Application filed October 25, 1921. Serial No. 510,286.

This invention relates to a method of and apparatus for making motion pictures of the type in which the screen image is binocular in the sense of containing a composition of images from two different points of view representative of two-eyed vision. The invention is particularly concerned with obtaining the effect of retinal rivalry, so called characteristic of normal human binocular vision. It is a fact well known to those acquainted with the phenomena of perception of vision that binocular attention upon an object is generally alternated with or proceded by attention principally to the image in one eye, followed by consciousness of that of the other eye producing a joint perception of the object. True binocular perception may thus be preceded or followed by alternations of monocular attention. The interval of time during which first one eye and then the other eye independently or predominantly perceives an object newly looked at is considerable; especially when changing attention from one center to another center of observation, and therefore changing the convergence of the optical axes of the eyes from one object to another, the observer may come to fixity upon the new objective in a binocular sense only after principal monocular attention has been given to the object a number of times by his right eye and his left eye in turn. I have found that this rivalry of attention, occurring before simultaneous coordination and binocular fixity upon the object looked at, is contributory to a high degree to the correct perception of distance, roundness, and other observable qualities of the object, and is a desirable factor in photography seeking to select for the observer of the screen image a particular center of attention by giving the correct illusion of normal vision directed to a particular object in the three-dimensional space represented by the picture.

So far as I am aware, no attempt heretofore has been made to simulate in the screen images of motion-picture photography that interplay of attention between the observer's eyes which in the case of real objects, serves to reveal prior to full attention the distance and form of the thing looked at. This invention provides a mode of doing this, and a genus of apparatus adapted to take motion pictures in which this effect is inherent.

In my application jointly with Charles A. Proctor, filed June 2, 1921, Ser. No. 474,560, we have shown apparatus for binocular motion picture photography by which images from two points of view are photographed as composite images of an object field viewed respectively from each of two points of view. For an example of the present invention, I shall describe the practice of the method with the aid of apparatus adapted to cooperate with the devices of the said joint application, as well as apparatus adapted to practice with certain other forms of binocular motion-picture photography. But it will be understood that the invention is concerned with the art of and means for attaining the effect of retinal rivalry in binocular motion picture photography, independently of the instances of apparatus explained by way of example.

In the accompanying drawings,—

Figure 1 is a detail plan view of the parts of a motion picture camera in which the elements of the optical system are mounted, parts being broken away to a section on line 1—1 of Fig. 2;

Figure 2 is a right hand side elevation of the device shown in Fig. 1, partly in section on line 2—2 of Fig. 1;

Figure 3 is a plan similar to Fig. 1 showing a modified device;

Figure 4 is a detail elevation of adjunctive devices employed with the device of Fig. 3;

Figure 5 is a plan in diagram illustrating another modification;

Figure 6 is a horizontal section partly in plan of another type of apparatus;

Figure 7 is a similar view of a modified form;

Figure 8 is an elevation of a rotating screen employed with the form shown in Fig. 6 or Fig. 7; and Figure 9 is an elevation illustrating the relation of a shutter and a modified form of the screen.

Referring now to Fig. 1, the camera 1 therein illustrated may comprise the usual film gate, film reels, advancing and exposing means, not shown, and may carry a photographic lens of appropriate type, not shown, central in a lens mount 2, and appropriately arranged for focusing and other motions. In front of the lens and its mounting 2, the device improved provides a mounting A, for a compound prism $p^1$, $p^2$, including a surface $g$ adapted to transmit and to reflect light incident upon it, and cooperating with mirror $m$; so that the lens in mounting 2 focuses upon the film a direct beam transmitted about axially of the lens and mounting 2 through the surface $g$, and a reflected beam first incident upon the mirror $m$, and then reflected from the rear and right hand face or surface $g$ as shown in Fig. 1. Light for the formation of the composite image thus made up enters the system about equally through the incidence faces $a$ and $b$ of the compound prism.

In order to obtain the effect of retinal rivalry, I prefer to produce the illusion of of monocular or alternate monocular vision followed by or preceded by binocular vision by shifting the point of view of the image photographed during an interval preceding or after composite photography from both points of view. I provide, in the preferred method, for diminishing and increasing the light brought to a focus by the camera lens respectively for the left-hand and right-hand view-points; for example, in the direct beam and in the reflected beam of the camera shown in Fig. 1, and for maintaining the total light of the image at a constant value irrespective of these changes.

Referring now to Figs. 1 and 2, each incidence face of the prism may have before it a compound shutter comprising a series of preferably staggered vertical spindles 10, which are expanded into thin vanes 12, and have integral or attached gears 13 near their lower ends; which terminate in cones 15 bearing on a hardened step-bearing strip 14, and are positioned by bearing holes in a bracket 16 providing a mounting for the shutter and attached to the mounting A for the prisms $p^1$, $p^2$. These shutters are too near the lens to cause any local effect in the image formed by light in either the direct or the reflected beam.

The vanes 12 are arranged to be rotated simultaneously through at least 90°. When in the position shown in Fig. 1, the vanes 12 for the direct beam together shut off all of the light, whereas the vanes 12 for the reflected beam are positioned edge-on in this beam, and pass substantially all of the light. Intermediate positions correspond to increasing illumination in the direct beam and decreasing illumination in the reflected beam. Preferably these motions of the two series are coordinate. It will be noted that the total amount of light reaching the film is at all times constant.

For example, as shown in Figs. 1 and 2, the gears 13 are arranged to be driven by reciprocating racks 20 and 21 respectively suitably mounted to slide in brackets 22, 23 of the mounting 16, and provided with driving means to secure the proper coordination of their motions. For instance, each rack 21 is expanded at 25 and diagonally slotted at 26 to take over an anti-friction roll 27, on a crank arm on a disk 28 integral with or attached to a short vertical shaft 29 arranged to be driven by chain on a sprocket wheel 30. It will be observed that the simple harmonic motions of the racks 21 differ in phase by 90° in respect to each other, and that a sufficient motion to rotate the vanes 12 through 90° (or 180° as shown) results in the closing of one of the shutters comprised of the vanes 12 during the opening of the other.

The chain for driving the sprocket 30 may be appropriately geared to a motor (spring or otherwise) or to the driving motion for the film advancing means, or may independently be provided with a hand-crank actuated driving train. These expedients for driving the shaft 29 may be varied according to the mechanism of the camera with which the devices are used, suitable forms will be obvious to any constructor, and in consequence are not shown.

The arrangement shown in Figs. 3 and 4 differs in respect to the mechanical connections. As shown, these comprise vanes 12, as before, similarly formed and mounted, but provided with skew gears 35 near their upper ends taking into elongated spiral driving gear 36 along each series of the vanes 12, the two drivers 36 being geared together by the bevels 37 and having bearings in appropriate brackets 38, Fig. 3; 39, Fig. 4. One of the drivers 36, and therefore the other, may be suitably driven; for instance a pinion 40 is arranged to mesh with a gear 41 carried by a Geneva wheel 42 driven by a driver 43, having a shaft preferably squared at 44 for connection to a flexible shaft for driving, not shown. The intermittent motion of the Geneva wheel is sufficient to open the shutter comprised of one series of the vanes 12 when the shutter comprising the other series is closed. As shown, the vanes 12 when perpendicular to the light do not overlap, and some light is always admitted in each beam.

In the form shown in Fig. 5, the vanes 12 are provided with gears 45 which mutually engage in a train, and the respective trains are driven by driving gear 46 adapted to be connected to and driven by a suitable flexible shaft, not shown, from any controllable connection.

In operation the device as shown in the forms mentioned may normally be positioned with the shutters in both beams at an angle of 45°, thus letting through light in both beams; or be actuated at such high speed as to cause equal durations of exposure during the exposure intervals of the camera shutter in the direct and in the reflected beams. When the center of interest point upon which the images, respectively are coalesced is about to be shifted, motion of the shutters 12 is caused to cease, leaving the path of one of the beams, direct or reflected, relatively unobstructed, and the other relatively closed. The usual successive exposures by the camera-shutter thus result in a monocular series of pictures so long as this condition continues. When the axis of the lens is shifted to a new center of interest, the shutters 12 are again put in motion, but slowly, so that the pictures first being made in rapid succession by the ordinary shutter are made first from one point of view, i. e., in the direct beam; and then from the other point of view, i. e. as reflected in the mirror $m$.

The result is to shift the point of view of the pictures being taken between the direct and the reflected points of view, without varying the total amount of light in the image, and to cause these respective monocular series of pictures to have a more generally distributed good definition than is the case with the binocular composites. This may be succeeded after an interval of a second or two, or less, by the rapid operation or intermediate positioning of the shutters 12, the observer of the screen picture being induced by the ensuing concentration of definition upon the center of interest to focus his attention upon this center of interest, now better defined than the remainder of the image.

While I have described the coordinate operation of the shutters 12 as a preferred way of operating the devices, it will be observed that the desired effect might also be obtained in some cases by independently and successively opening and closing the vanes 12 in the direct and in the reflected beams.

Other ways of reaching the desired effects are within my invention. For example, as shown in Fig. 6, the camera employed may be of one of the kind having two lenses L, $L^1$, and an optical system behind the lenses comprising the reflectors $R^1$, $R^2$, $R^3$ and the light dividing and reflecting surface $g$, in order to produce composite images on films $f^1$ and $f^2$ simultaneously, which by the use of suitable screens $s^1$, $s^2$ may be complementary color-value pictures. In this arrangement the camera shutter 50 may be arranged to be driven by an exterior sprocket 51 between the lenses $L^1$ and $L^2$.

According to the present invention monocular photograph by the lenses $L^1$, $L^2$ in turn is provided for. The shutter shaft 52 may be tubular, for example, to provide an end bearing for a stud 53 projecting centrally from a clutch member, such as a friction plate 54. Within the bore of the shaft 52 an anti-friction ball 55 and an adjustable spring 56 tend to maintain the plate 54 away from another similar member 57 attached to the end of the tubular shaft 52. Attached to the plate 54, a pinion 60 of the gear train $60^a$, $60^b$, $60^c$, is arranged to be acted on centrally by one end of the clutch operating bell-crank lever 62, pivoted at 63, and adapted to be operated by the hand slide 64. The gear train 60, etc., is carried in a suitable bracket bearing 65, which is provided with a hole for a stud shaft 66 attached to the last gear of the train, and which carries a variably transparent rotary screen 70 extending in front of the lenses $L^1$, $L^2$.

The screen 70 (see Fig. 8) may be of glass or other plane-parallel material, and is pigmented so as to be opaque on its side $70^a$ and transparent on its side $70^b$, and to vary gradually from opaque to transparent on one side of the diameter $70^c$. Preferably the region straddling the diameter $70^c$ is evenly shaded to transmit light of the mean intensity transmitted by the screen as a whole, and the disk 70 is provided with a stop notch 71, for a dog 73 on the spring arm 74 of the hand slide 64. When the clutch 54, 57 is released and dog 73 takes into notch 71 of the disk 70, the lenses $L^1$, $L^2$ are equally obstructed by the portions of the screen straddling diameter $70^c$. The disk 70 may be turned so that one or the other of said lenses at will is made inoperative by the denser part of the screen 70.

When the disk 70 is rotated by the operation of the clutch 54, 57 and the gear train, the slide 64 having been moved to the right, the lenses are shuttered by the opaque part of the screen one after the other at intervals of a number of exposures of each lens by the camera shutter 50, during times depending on the ratio of the gear train 60, etc. The motion pictures thus made are therefore made first from one point of view and then from the other point of view during such a time as the disk 70 is permitted to rotate.

In the modified form shown in Fig. 7 the shutter 50 is driven by a tubular shaft 80 and sprocket 81 fast thereto. Within said shaft a secondary shaft 84 is arranged to carry an annulus 85 of graduated transparency, like the disk 70. Shaft 84 has fast thereon a sprocket 86 by which the screen 85 may be driven, and stopped. When the screen 85 is driven at a lesser rate than the shutter 50, the shutter openings $50^a$, $50^b$ (Fig. 9) will in turn be opposite the dense portions of the rotating screen at its passage of each one of the lenses $L^1$, $L^2$, to produce the effect described above. If the screen 85 is rotated at the same speed as the shutter 50, the lenses $L^1$, $L^2$ will by the opaque part of the screen moving in unison with one of the openings $50^a$, $50^b$, be caused to contribute their component of the composite image in turn at the exposure interval of the camera. If stopped while the opaque portion is between the lenses, the lenses form simultaneous images. If driven faster than the shutter, the screen 85 will merely diminish the light in use. In operation of this form the dense part of the screen 85 is preferably arranged to rotate in unison with and behind an opaque part of the shutter 50, as by coupling together the driving means, when the effect of retinal rivalry is not to be produced.

I claim:—

1. The art of making motion picture photographs comprising forming images from different points of view, exposing successively different parts of a sensitive surface during separate exposures following each other at intervals within the time of the persistence of vision to each of these images severally, and thereafter exposing other successively different parts of the sensitive surface to the images simultaneously.

2. The art of making motion picture photographs comprising forming a composite image having components formed from different points of view, exposing successively different parts of a sensitive surface to the component images successively, and thereafter exposing other successively different parts of the sensitive surface to the composite images.

3. The art of making motion pictures having the effect of retinal rivalry in connection with the first attention of the observer upon a center of interest comprising as a step the formation of monocular images of the same object from different points of view and the successive exposure of successively different areas of a sensitive film strip to each of these images severally during suitable times the successive exposures being at suitable intervals for persistence of vision.

4. The art of making motion pictures having the effect of retinal rivalry in connection with the first attention of the observer upon a center of interest comprising as a step the formation of monocular images from different points of view and adapted to coalesce at the image of the center of interest to make a binocular composite, and the exposure of successively different parts of a film strip respectively, at successive intervals suitable for persistence of vision, predominantly to one of said monocular images, thereafter to the other of said monocular images, and then to the composite image comprising both monocular images.

5. The art of simulating the phenomena of retinal rivalry and binocular vision in motion picture photography comprising making a negative film-strip by successive exposure of different picture spaces at time intervals within the time of persistence of vision to monocular images, respectively from different points of view and in registering relation at a center of interest, varying the amount of light in said images respectively during a preliminary interval, and thereafter continuing the exposures during substantially equal illumination of the respective images.

6. The art of simulating the phenomena of retinal rivalry and binocular vision in motion picture photography comprising making a negative film-strip by successive exposure of different picture spaces at time intervals within the time of persistence of vision to monocular images respectively from different points of view and in registering relation at a center of interest, varying the amount of light in said images inversely in respect to each other during a preliminary interval, and thereafter continuing the exposures during substantially equal illumination of the respective images.

7. The art of simulating the phenomena of retinal rivalry and binocular vision in motion picture photography comprising making a negative film-strip by successive exposure of different picture spaces at time intervals within the time of persistence of vision to monocular images respectively from different points of view and in registering relation at a center of interest, and varying the intensity of illumination of said respective monocular images from one to another of successive exposures during maintenance of the intensity of illumination of the composite image resulting from both during change in and subsequent to coalescence of the images on a center of interest.

8. The art of simulating the phenomena of retinal rivalry and binocular vision in motion picture photography comprising making a negative film-strip by successive exposure of different picture spaces at time intervals within the time of persistence of vision to monocular images respectively from different points of view and in registering relation at a center of interest, and varying the intensity of illumination of said respective monocular images during maintenance of the intensity of illumination of the composite image resulting from both during change in and subsequent to coalescence of the images on a center of interest and thereafter continuing the exposures during substantially equal illumination of the respective images.

9. Apparatus for motion picture photography simulating the effect of retinal rivalry having therein means for forming images of the same object from different points of view, means for advancing a sensitive surface at intervals within the time of persistence of vision and means for exposing and occluding images between advancing motions of the sensitive surface, and means to occlude the light for one image in varying degrees, whereby to change the relative illumination of the respective images.

10. Apparatus for making motion pictures of the type in which the image photographed is a composite of images formed from separated points of view having therein, in combination with means for forming the respective images, means for relatively varying the intensity of the light in the respective images during substantial maintenance of a constant total illumination of the composite image.

11. Apparatus for binocular motion picture photography of the type in which the image photographed is a composite of monocular images of the same object formed from laterally separated points of view having therein, in combination with means for forming the respective images of the same object on a light sensitive surface, means for inversely and simultaneously varying the intensity of the light in the respective monocular images, and means for making exposures of different areas of the sensitive surface to composite images respectively differing in intensity of illumination of their components.

12. Apparatus for motion picture photography of binocular composites, each composite picture consisting of a record of monocular images respectively from different points of view, said apparatus having therein means for forming the monocular images, in combination with means for simultaneously and oppositely varying the amount of light gathered for the respective component images, means for exposing the sensitive surface to the images, and means for coordinating the light-varying and the exposure times.

13. Apparatus for photography having therein means for forming images of the same object from different points of view and means arranged to occlude the light for one image in varying degrees whereby to change the relative illumination of the respective images comprising shutters for the light for the respective images, and means for coordinately opening and closing said shutters.

14. Apparatus for making motion pictures of images of an object respectively formed from separated points of view having therein, in combination with means for forming the respective images, means for exposing a sensitive surface to one or to another of said images alternatively, or to a composite image containing both.

15. Apparatus for making motion pictures of images respectively formed from separated points of view having therein, in combination with means for forming the respective images and a shutter for exposing the successive pictures on a film-strip, means for exposing the film-strip to one or to another of said images alternatively, or to a composite image containing both, and means for rapidly shifting from exposure of one kind to the other kind during continued operation of said shutter.

16. In apparatus for motion pictures photography, means for simultaneously forming images from different points of view on the same image space, in combination with means for varying the relative intensity of illumination of the respective images at successive exposures.

Signed by me at Hanover, New Hampshire, this 13th day of October, 1921.

ADELBERT AMES, Jr.